United States Patent
Simonis

(10) Patent No.: US 7,802,012 B2
(45) Date of Patent: Sep. 21, 2010

(54) ESTIMATING TRAFFIC VALUES OR INTERVALS FOR NETWORK TOPOLOGY AND NETWORK BEHAVIOUR

(75) Inventor: Helmut Matthias Simonis, Richmond (GB)

(73) Assignee: Cisco Technology, Inc., San Jose, CA (US)

( * ) Notice: Subject to any disclaimer, the term of this patent is extended or adjusted under 35 U.S.C. 154(b) by 1032 days.

(21) Appl. No.: 10/505,445

(22) PCT Filed: Feb. 17, 2003

(86) PCT No.: PCT/GB03/00684

§ 371 (c)(1),
(2), (4) Date: Jun. 3, 2005

(87) PCT Pub. No.: WO03/075508

PCT Pub. Date: Sep. 12, 2003

(65) Prior Publication Data

US 2005/0254426 A1    Nov. 17, 2005

(30) Foreign Application Priority Data

Mar. 1, 2002    (GB) ................................. 0204913.8

(51) Int. Cl.
*G06F 15/173*    (2006.01)

(52) U.S. Cl. ..................................................... 709/242

(58) Field of Classification Search ................. 709/233, 709/239, 242; 370/252, 389, 238
See application file for complete search history.

(56) References Cited

U.S. PATENT DOCUMENTS

| 5,598,532 | A | 1/1997 | Liron | |
|---|---|---|---|---|
| 7,047,316 | B2 * | 5/2006 | Iwata et al. | 709/240 |
| 7,302,482 | B2 * | 11/2007 | Rodosek et al. | 709/224 |
| 2003/0058798 | A1 * | 3/2003 | Fleischer et al. | 370/238 |
| 2004/0257999 | A1 * | 12/2004 | MacIsaac | 370/252 |

FOREIGN PATENT DOCUMENTS

| EP | 1 111840 A | 6/2001 |
|---|---|---|
| WO | WO 01 17169 | 3/2001 |

* cited by examiner

*Primary Examiner*—Nathan Flynn
*Assistant Examiner*—Mark O Afolabi
(74) *Attorney, Agent, or Firm*—Cindy Kaplan

(57) ABSTRACT

A method of estimating traffic values or intervals in a communications network, the network comprising a plurality of nodes being interconnected by links, the method comprising the steps of (a) obtaining traffic data through the nodes or links as input data; (b) obtaining network data relating to the network topology and network behaviour; and (c) estimating the effect of a modification of the communications network and/or its behaviour be calculating traffic information between a selected first and a selected second node of the network using the input data.

18 Claims, 6 Drawing Sheets

ESTIMATING TRAFFIC VALUES OR INTERVALS FOR NETWORK TOPOLOGY AND NETWORK BEHAVIOUR This application claims benefit of co-pending PCT application PCT/GB03/00684 filed Feb. 17, 2003, which was published in English under PCT Article 21(2) on Sep. 12, 2003, which claims the benefit of GB Application No. 0204913.8 filed Mar. 1, 2002. These applications are incorporated herein by reference in their entireties.

This invention relates to a method and system of estimating traffic data. More particularly, but not exclusively, it relates to methods of calculating traffic values or intervals in a communications network in order to estimate the impact of a proposed modification to the network.

BACKGROUND

Today, large communications networks are serviced by more than 30,000 Internet Service Providers (ISPs) across the world, predominantly operating on a commercial basis as a service provider. The services range from the mass-marketing of simple access products to service-intensive operations that provide specialized service levels to more localized internet markets. The present application mainly concerns ISPs providing networks, referred to more generally as network service providers.

With networks playing an ever-increasing role in today's electronic economy, an efficient management of the networks and an efficient planning of future modifications is advantageous.

With the rapid growth of network usage, network service providers are currently facing ever increasing expectations from their customers to the quality of service (minimum delay, maximum reliability, high bandwidth for data transfer rates, low costs, etc). The main task is to satisfy the quality of service parameters while maximising the return of investment, i.e. to ensure an efficient utilisation of the available bandwidth in addition, but there are issues relating to future sales, strategic planning and business development. One concerns Service Level Agreements (SLAs) with their customers.

An SLA is a service contract between a network service provider and a subscriber, guaranteeing a particular service's quality characteristics. SLAs usually focus on network availability and data-delivery reliability. Violations of an SLA by a service provider may result in a prorated service rate for the next billing period for the subscriber.

Thus it is important for a network service provider to know whether it can issue an SLA to another customer without violating any existing SLAs. Here it needs to estimate what is the largest new workload that the network can handle with respect to network availability and data-delivery reliability.

In strategic planning, the objective is to investigate how to revise the existing network topology (and connection points to external nodes) such that the resource utilization is minimized and more balanced. The problem is to minimize the resource utilization by determining which backbone links are overloaded, and to add links to the network to redistribute the load. For a given workload, the question is where to add the links in the network and what is the required bandwidth of each backbone link such that the capacity of the new network topology is greater, i.e. can deal with a larger load. Another question concerns which node should be used to connect a new customer to the network. This should be the one which minimises resource utilisation and expands capacity in the most cost effective way.

There are several tools available for planning and optimising communications networks. They are usually based on a discrete event simulation of the network. For this, a typical scenario of end-to-end loads must be provided as input by the user. Starting from this scenario, the tool simulates the transport of the traffic through the network, observing link utilization overload and other events.

End-to-end traffic data are usually obtained by using probes or router-based information. Such a method is expensive to implement and usually only a part of the whole network is equipped with data collection points. The data collection process has the additional disadvantage that it adds to the traffic congestion of the network.

Such traffic data, if available, may then be used in network modelling or a network simulation. However, most simulations are not based on real data, but only on estimates. The simulation is then used for network planning or optimisation tools. The user usually defines a scenario which is then tested using the simulation tool.

There are network management packages available for example those by OPNET or WANDL which are based on a simulation of the network. However, a simulation of a complex IP network is a very resource-consuming operation.

In the applicant's patent application GB 0 028 848, filed on 27 Nov. 2000 (agent reference J42831GB), a method is described which calculates upper and lower bounds of end-to-end traffic flows in a communication network which is based on traffic flow data measured in the network. The obtained end-to-end traffic flow data are then used for optimisation and planning of the communications network. However, also in this case the operation of obtaining end-to-end traffic flow data and the subsequent running of an optimisation analysis is a costly and resource-consuming operation.

SUMMARY OF THE INVENTION

It is thus an aim of the present invention to alleviate the disadvantages mentioned above and to provide information for a network optimisation tool.

It is a further aim of the present invention to calculated traffic values or intervals in a communications network in order to estimate the effect of modifying the network.

According to one aspect of the present invention, there is provided a method of estimating traffic values or intervals in a communications network, the network comprising a plurality of nodes being interconnected by links, the method comprising the steps of: (a) obtaining traffic data through said nodes and/or links as input data; (b) obtaining network data relating to the network topology and network behaviour; and (c) estimating the effect of a modification of said communications network and/or its behaviour by calculating traffic information between a selected first and a selected second node of said network using said input data.

In this way the impact of a modification can be estimated using the traffic data and network data from the initial, unmodified network in a relatively cheap and simple way without the need of calculating traffic values in a more complex model. This estimation may for example be used to automatically select certain modifications out of a set of possible modifications and to evaluate the impact of each modification. The best candidates for a proposed set of modifications can thus be determined and a more complex and more complete analysis of these best candidates can then be performed.

According to another aspect of the present invention, there is provided a method of calculating traffic values or intervals in a communications network, the communications network comprising a plurality of nodes, the nodes being connected to one another by links, the method comprising: calculating the cumulated traffic flow between a first and a second of said nodes in a traffic flow model using linear constraints; said traffic flow model being based on (a) traffic data measurements through said nodes and links as input data; and (b) a plurality of constraints describing the network topology and behaviour.

In this way the cumulated flow may for example be used to find interesting candidates for a modification of the network topology or network behaviour and a full analysis of the selected best candidates can then be performed using the same traffic flow model as was used for the cumulated flow analysis.

Preferably, the traffic flow model is used to check the input traffic data for inconsistencies, such that errors can be corrected if inconsistencies have been detected.

According to another aspect of the present invention, there is provided a method of calculating traffic values or intervals in a communications network, the communications network comprising a plurality of nodes, the nodes being connected to one another by links, the method comprising: obtaining traffic data through said nodes and links as input data; and calculating a cumulated traffic flow from a selected first node to a selected second node using said input traffic data.

According to another aspect of the present invention, there is provided a method of modifying a communications network, the network comprising a plurality of nodes being interconnected by links, the method comprising the steps of (a) obtaining traffic data through said nodes and/or links as input data; (b) obtaining network data relating to the network topology and network behaviour; and (c) automatically selecting promising candidates for a network modification by calculating a cumulated flow using said traffic and network data, wherein the candidates are selected according to pre-defined selection criteria.

Further aspects and advantages of the invention will be appreciated, by example only, from the following description and accompanying drawings, wherein FIG. 1 illustrates a simplified example of an Internet Protocol (IP) network in which the present invention can be implemented;

Figure 1:
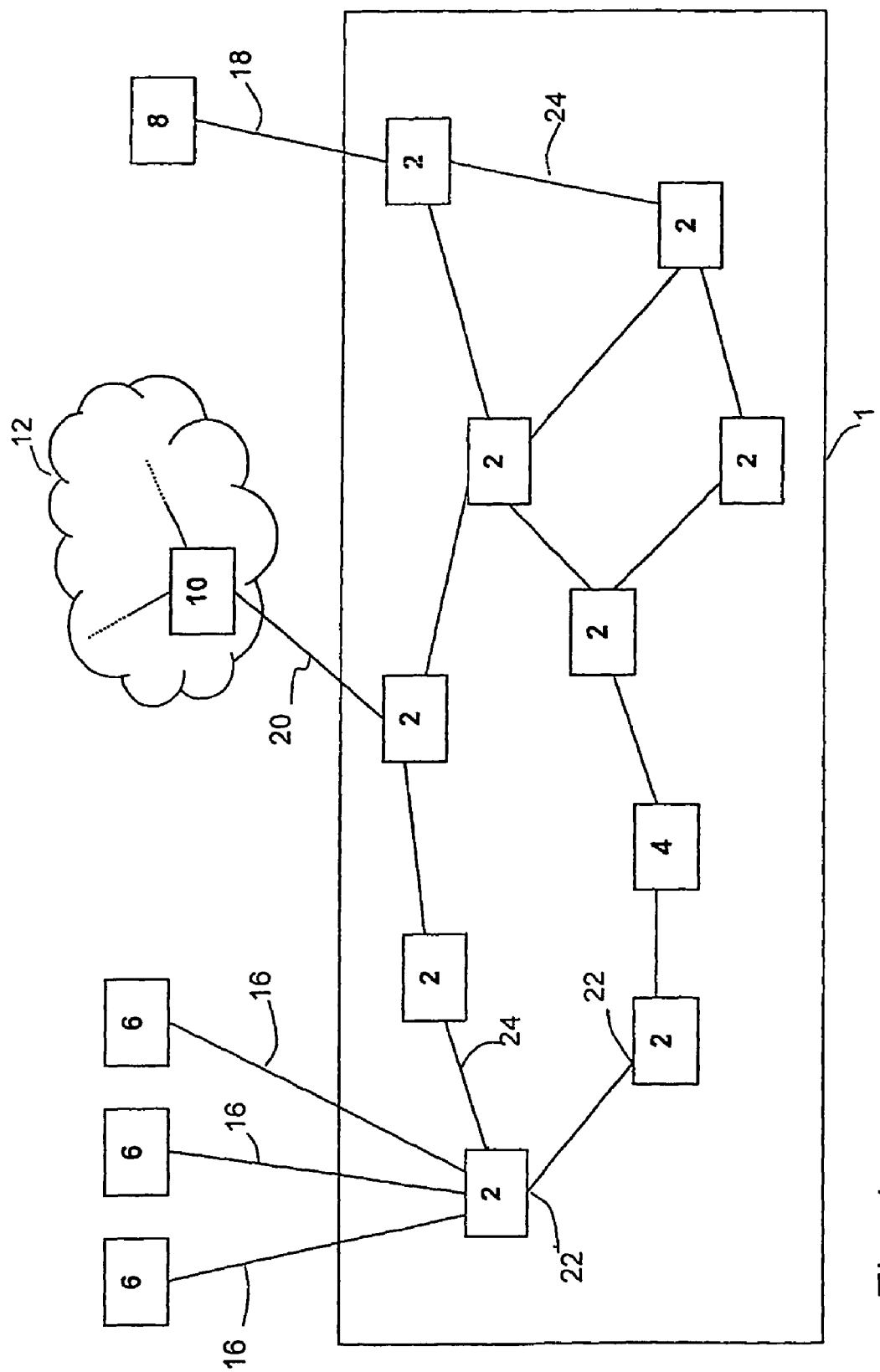

FIG. 1 illustrates a simplified example of an Internet Protocol (IP) network. Generally, such a network consists of nodes and links. Nodes in an IP network may either be internal or external. An internal node represents a location in the network where traffic data is directed through the network. It can be of two types: a device node 2 denoting a network device such as for example a router or a network node 4 denoting a local network (e.g. Ethernet, FDDI ring). An external node 6 represents a connection to the IP network from other networks.

A link is a directed arc between two nodes. Depending upon the nature of the two nodes, network links take different denominations. There are two main types of links, the backbone and access links.

A backbone link 24 is a link between two internal nodes; at least one of them must be a device node. Indeed, every link in an IP network can connect either two device nodes or one device node and one network node. A connection to a device node is realized via a physical port of the device. If the device is a router, then the port is called router-interface 22. A connection to a network node is realised via a virtual port of the network.

An access link is a link between a device node and an external node. Access links include peering links 18, uplink links 20 and customer links 16.

A PoP (point of presence) is the set of all devices co-located in the same place.

The link traffic is the volume of data transported through a link and is measured in mbps (mega bits per seconds). The bandwidth of a directed link defines the maximum capacity of traffic that can be transported through this link at any one time.

In this embodiment, we refer to IP-based networks. In an IP network the device nodes are represented by routers; we assume that any two nodes are directly connected by at most one link, and every external node is directly connected to one internal device node.

A path from a source to a destination node is a sequence of linked nodes between the source and destination nodes. A route is a path between end-to-end internal nodes of a network that follows a given routing protocol.

A traffic load is the load of data traffic that goes through the network between two external nodes independently of the path taken over a given time interval.

A traffic flow between external nodes is the traffic load on one specific route between these nodes over a time interval.

A router is an interconnection between network interfaces. It is responsible for the packet forwarding between these interfaces. It also performs some local network management tasks and participates in the operations of the routing protocol (it acts at layer 3, also called the network protocol layer). The packet forwarding can be defined according to a routing algorithm or from a set of static routes pre-defined in the routing table.

A routing algorithm generates available routes for transporting data traffic between any two nodes of a given network.

In the following, embodiments of the present invention will be described which are based on the OSPF (Open Shortest Path First) routing algorithm for IP-based networks. This algorithm determines optimal routes between two network nodes based on the "shortest path" algorithm. The metrics to derive the shortest path are fixed for each link, and hence the routing cost is computed by a static procedure. The lowest routing cost determines the optimal route. If there is more than one optimal path, then all optimal paths are solutions (best routes) and the traffic load between the two end-nodes is divided equally among all the best routes.

Figure 2:
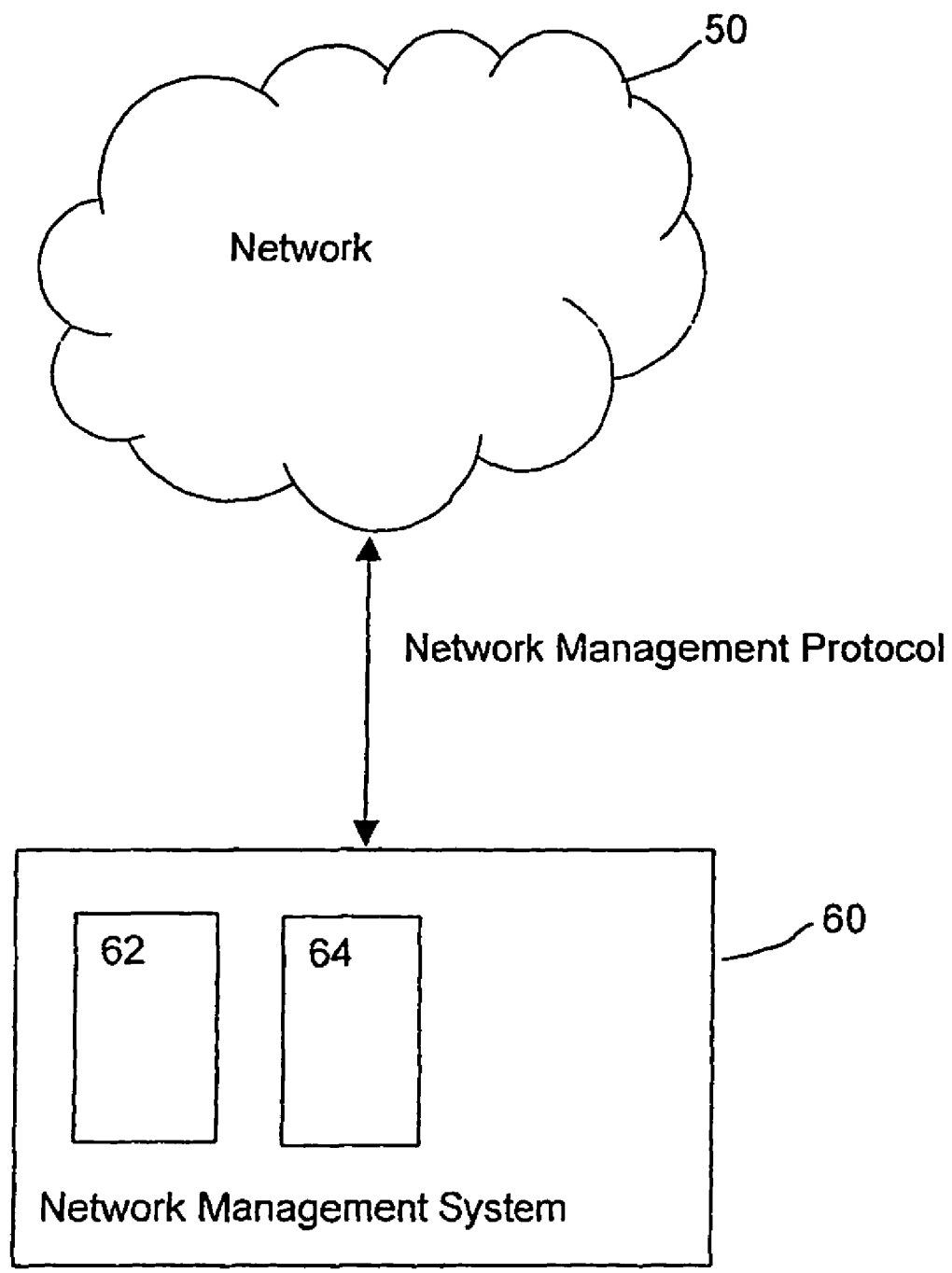
FIG. 2 illustrates the relationship of a network and a network management system, into which the present invention may be implemented.

FIG. 2 illustrates the relationship of the network and a network management system 60 in which the present invention may be implemented. Network management system 60 performs the network management functions for network 50. The network management system communicates with the network using a network management protocol, such as the Simple Network Management Protocol (SNMP). The network management system 60 includes a processor 62 and a memory 64 and may comprise a commercially available server computer. A computer program performing the calculation of data traffic is stored is memory 64 and can be executed by processor 62.

The general idea of the present invention will now be illustrated in a simplified example.

Figure 3A:
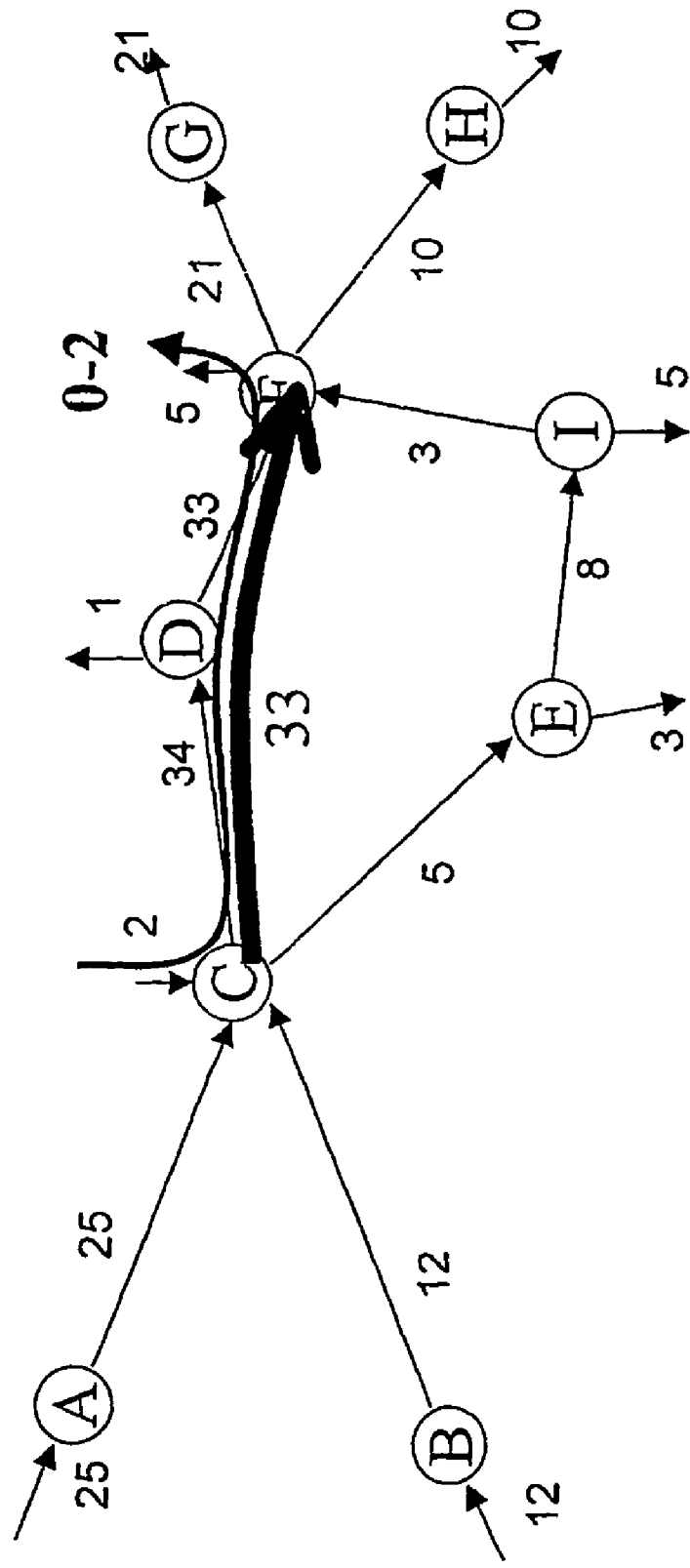
FIGS. 3A and 3B illustrate in a simplified way the method used to calculate cumulated flow for estimating traffic values in a modified scenario according to the present invention.

FIG. 3A shows a communications network including nodes A to I. The nodes are connected by a number of links. We have obtained traffic measurements for the individual links, resulting in the values depicted in the figure. For example, the directed link traffic between nodes B and C is 12, between nodes A and C 25, and the traffic entering at node C is 2.

We are now interested in the flow between nodes C and F. The available information about the end-to-end flow C to F is very limited. We know that it is bounded by the traffic entering the network at node C (value 2) and by the traffic leaving the network at node F (value 5). But we can not determine how much of the traffic entering at node C leaves at node F, since there are many other possible destinations. As there is a significant volume of traffic that is entering and leaving at other nodes but also passing over the connection C to F, we can not isolate the end-to-end flow between C and F from this other traffic. So the best we can obtain is an interval 0-2 for the end-to-end traffic flow from C to F.

However, we have an accurate knowledge of the cumulated flow between nodes C and F. This cumulated flow between nodes C and F is the sum of all traffic which flows between C and F. Generally, a cumulated flow between two nodes p and q is the sum of all traffic flows between external nodes such that p and q lie on the route of the traffic flow and p is an ancestor of q on the route.

We can derive from the measured data values that the cumulated flow CF has to be 33 (the link traffic between nodes C and D is 33, the link traffic between nodes D and E is 34, a traffic of 1 leaves node D and the total traffic between nodes C and F is 33).

This knowledge of the cumulated flow can for example be used for estimating the traffic of new links in a modified network.

Figure 3B:
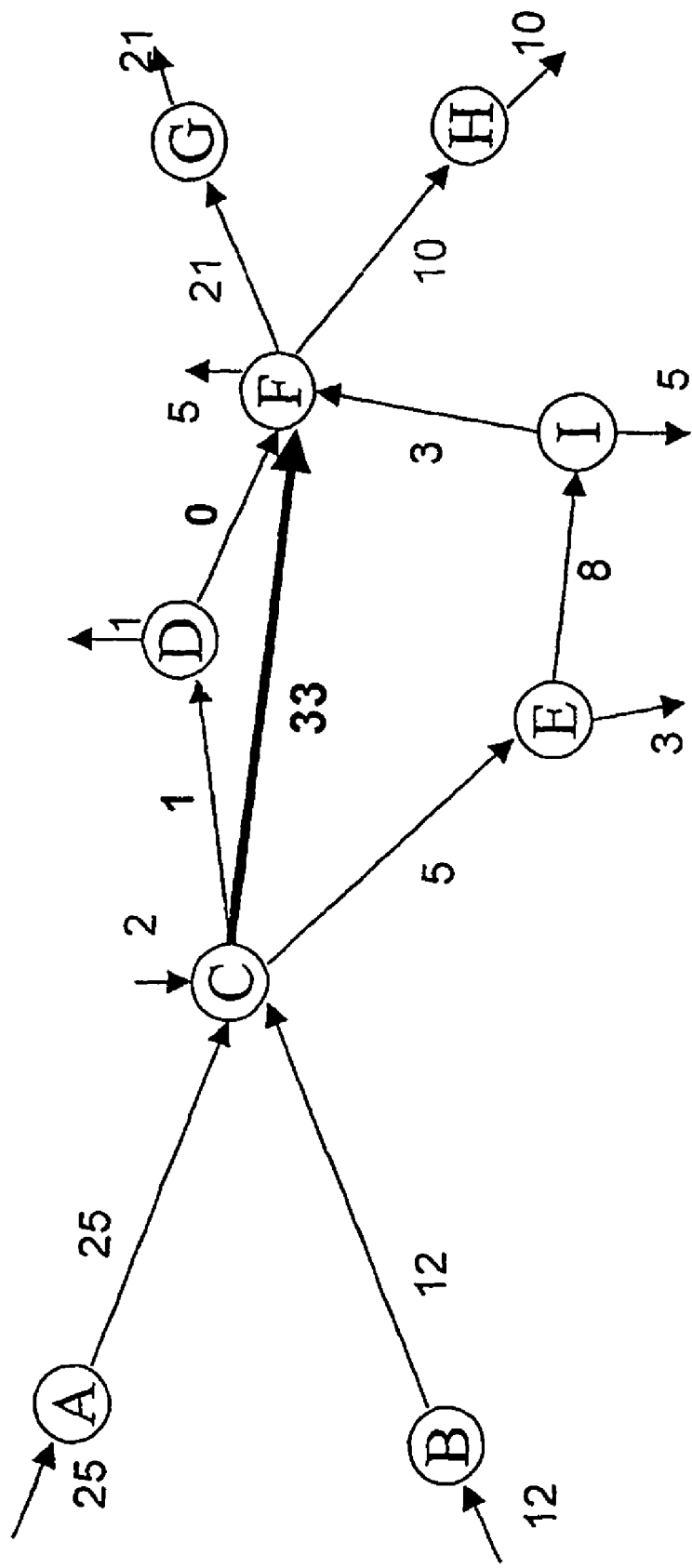

In our simplified example we might for example want to know what the traffic would be on a new direct connection C to F. Referring now to FIG. 3B, we can derive from the cumulated flow analysis (CFA) described above that the traffic on the new link CF is 33.

This calculation is based on the assumption that the new link does not affect other traffic in the network. However, this is generally not true. Adding a new link can affect other traffic, as any new link might attract traffic additionally to the traffic as estimated by the cumulated flow analysis, depending on its routing metric value. In order to determine the true amount of traffic on a new link, the routing procedure has to be performed on the modified network. Then we know whether (and which) traffic the new link attracts and the total amount of traffic on the new link can be calculated.

Nonetheless, the cumulated flow approach may be used to get an estimate or a limit for the traffic between nodes of a network or on a new link in a modified network. As the calculation of the cumulated flow is a straightforward operation, it is a useful tool in network planning. The calculation of cumulated flow is especially useful in large networks, where other, may be more precise, but also more complex, methods are more time and/or resource consuming.

Because the calculation of the cumulated flow is a relatively cheap operation, it is suitable for a systematic study of different modification scenarios of a large communications network. For example, CFA may be used to systematically study the impact of possible new links in a network. A service provider may for example want to add links to his network in order to improve the available capacity. He can then use the CFA to get an estimate which additional links would be suitable to distribute the traffic load more evenly or according to the available bandwidth between the already available and new links. Or the question might be which additional links are the best candidates resulting in a cost-benefit analysis. The service provider is able to try any possible combination of two nodes or PoPs in a particular network area with help of the CFA. CFA may also be used to find the most suitable node out of a plurality of nodes to extend a particular PoP by estimating the impact it would have. Every possibility could be estimated easily even if the number of possible combinations of nodes is high.

Thus CFA can be used to produce a "short list" of suitable or interesting candidates for an optimisation of a network where a significant impact can be expected. Alternatively, a list of best candidates may be produced using the CFA.

The candidates resulting from the CFA analysis can then be used in other, more precise or complete models to produce an accurate or more accurate calculation or estimate of the traffic to be expected in the modified scenario.

The results of the CFA can also be used in traffic engineering, i.e. in changing the route a flow is taking in the network. The value of the cumulated flow between two nodes indicates the amount of traffic that would be affected by creating a tunnel between those nodes in order to divert the traffic away from an observed bottleneck.

Generally, the cumulated flow analysis does not necessarily need to give an accurate value. The resulting information of a CFA may yield an interval of values, specifying the upper and lower bounds of a flow. This may for example be the case if the measured traffic data are not complete, i.e. if information about the traffic or certain links is not available or in a more complex network where ambiguities result.

Figure 4:
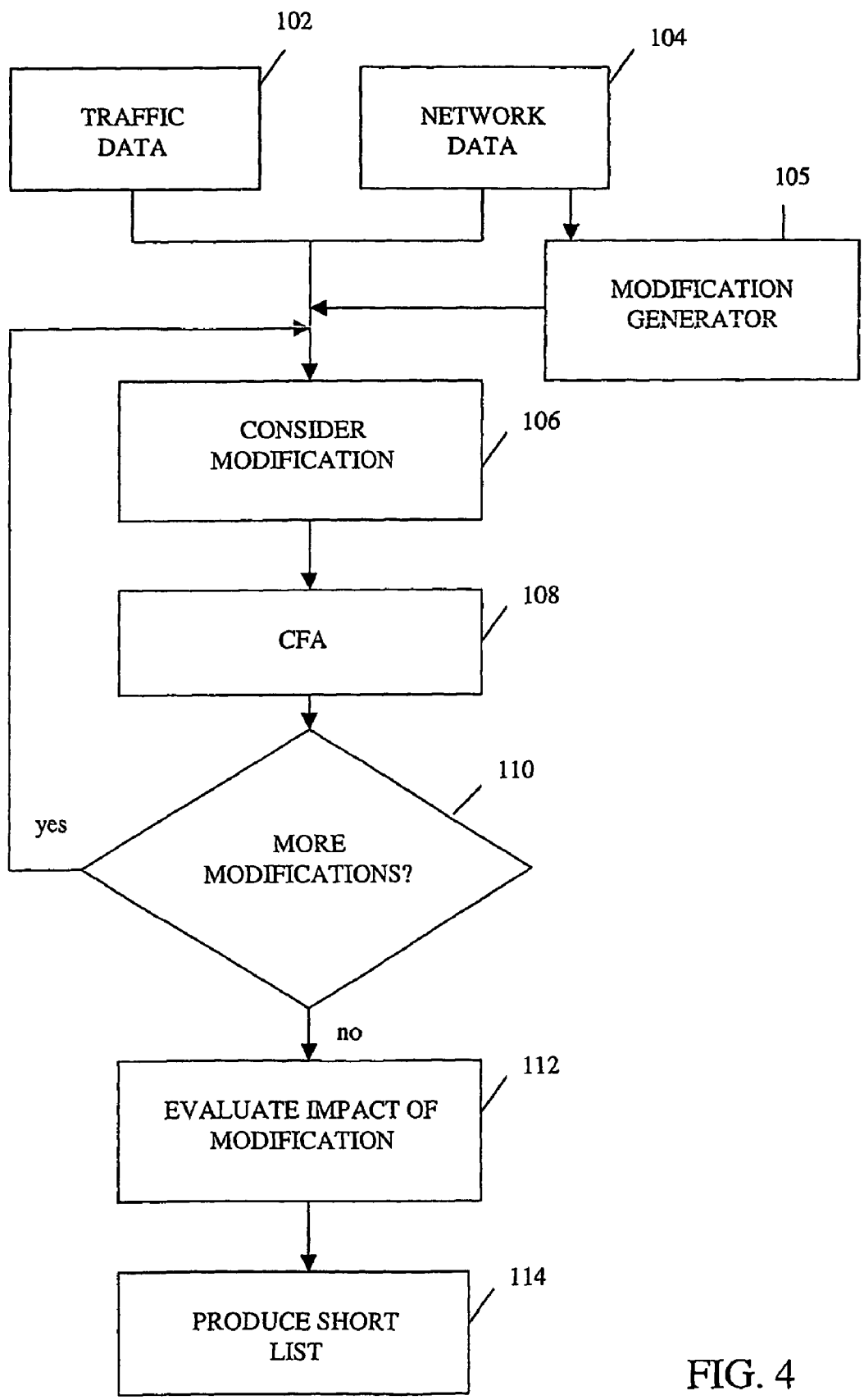
FIG. 4 is a flow chart diagram illustrating individual steps of performing a CFA according to embodiments of the present invention.

Referring now to FIG. 4, we describe the individual steps of a traffic flow optimiser according to one embodiment of the present invention. In step 102 traffic data are provided for the CFA.

In this embodiment, traffic data are measured directly from the network considered. Suitable network elements have to be selected from which information is provided and in which measurements of traffic data are made.

In the embodiments described, traffic data are provided as snapshots of current traffic on the network. Traffic data are collected for a certain time interval and are collected on a regular basis. According to one embodiment, traffic data are collected every 5 minutes and the user may choose the interval over which data is collected. A time interval of, for example, 20 to 25 minutes is suitable. Measurements relating to the average flow rate of traffic data passing through every link are taken and stored. The average flow rate of traffic data is the total traffic volume divided by the time interval. For example if a total traffic of 150 Mbit have been counted between T1 and T2, the average data is 150/(T2−T1). This approach does not show high peaks in the traffic flow. But it is sufficient to determine the load being carried through a network.

According to the embodiments described herein, traffic data is collected either directly from the network devices or from tables stored in the network management system. The network management protocol such as the SNMP provides access to the incoming and outgoing traffic at a given time at each router and each router interface.

In step 104 network data, i.e. information about the network topology and behaviour are provided. Network data may include information about the set of routers, the routing information and the set of end-to-end paths. Information about the set of routers also include information about the set of interfaces. Routing information may include OSPF routing, the TCP transport protocol, the UDP transport protocol and the list of static routes. The set of end-to-end paths may for example include all optimal routes.

In step 105 the modification generator generates a set of modifications topology of the network or network behaviour to be evaluated using CFA. A first modification, such as a new link to be introduced from a first to a second node, is considered in step 106. In step 108 the cumulated flow is calculated as described above, using the input traffic data and network data. In step 110 the optimiser element checks whether there are further modifications to be considered. If the answer is yes; then steps 106 to 110 are repeated until the cumulated flows are calculated for all modifications of the set provided. In step 112 the results of all CFAs are collected and the optimiser evaluates the impact of each modification considered. The evaluator may for example select the new links which attracts the most traffic according to the CFA, or the evaluator may perform a cost-benefit analysis to select the most promising candidates for a modification for the network. In step 114 the evaluator produces a short list of the selected "best candidates" of possible modification. This list can then be used to perform a more detailed analysis for the most promising candidate.

In the applicant's patent application GB 0 028 848, filed on 27 Nov. 2000 (agent reference J42831 GB) and in co-pending application of the same applicant filed on the same day as the present application (agent reference J44139 GB), the applicants describe a traffic flow model (TFM) which may be used to calculate traffic values in a communications network. Input data for the TFM are traffic data measurements, like the data rate per link of the initial network. The TFM is built using a plurality of constraints which describe the topology and behaviour of the network and can then be used to calculate intervals of traffic flows between two nodes using the input data. This is done by solving a linear programming optimisation problem. An objective function is built for the upper and lower bound of a traffic flow to be calculated and an optimisation algorithm is used to derive the bounds. Usually the objective function is linear. However, certain non-linear objective functions are also suitable. As described in the co-pending application referred to above, the model can also be used to derive traffic information for a modified scenario, like a modified network topology, modified routing procedures or a modified traffic load distribution. In this case, the constraints may also include the interdependency of the initial to the modified scenario. More details about the TFM may be found in applications mentioned above.

Such a TFM may be used to calculate the cumulated flows. As the TFM already includes all necessary information (i.e. the traffic on the individual links, the network topology and behaviour), the cumulated flow can be expressed as an additional linear constraint in the model and the values (or intervals) of the cumulated flows between any two nodes can be calculated.

An advantage of using a TFM for the CFA is that error correction can be used to ensure that the measured traffic data used as input data are self-consistent.

The measured traffic data may be inconsistent. As such inconsistencies affect the TFM, the data are corrected in embodiments of the present invention.

A reason for inconsistencies might for example be that some network data is lost (e.g. the collected data from a router is not transported through the network). Other reasons might be that the network configuration is wrong (e.g. the counter for the size of traffic on a given interface does not represent the size of that traffic) or that the network data from different router interfaces (in case of a router-router directed link) is not collected at the same time and results in slight differences of size.

The data are corrected using the measured raw data and constraints derived from the topology of the network and routing protocols. The following constraints may for example be used for error correction:

for each route, the total traffic coming in is equal to the total traffic going out;

for each link between the interface j of router i and the interface l of router k, the outgoing traffic data on the interface j from the router i is equal to the incoming traffic data on the interface l of router k.

If constraints are fulfilled, i.e. if no error is detected, the input values are not corrected and the process continues. If an error is detected, then the error correction is minimised using the constraints and a minimisation procedure. Error correction variables are introduced, for example variables specifying the corrected traffic volume for every single node or an overall error correction. An objective function is built from the constraining relationships using linear programming.

Output of the correction procedure are the error variables. Using these variables, the measured data can be corrected such that they are consistent for the application of a constraint model.

The procedure of error correction is similar to what we described in patent application GB 0 028 848. We refer to this document for further details.

An additional advantage of using TFM for the CFA is that the same TFM may be used at a later stage to derive the more accurate traffic values in estimating the effects of a modified scenario, for example after a short list of the most promising modification candidates has been produced using CFA.

Figure 5:
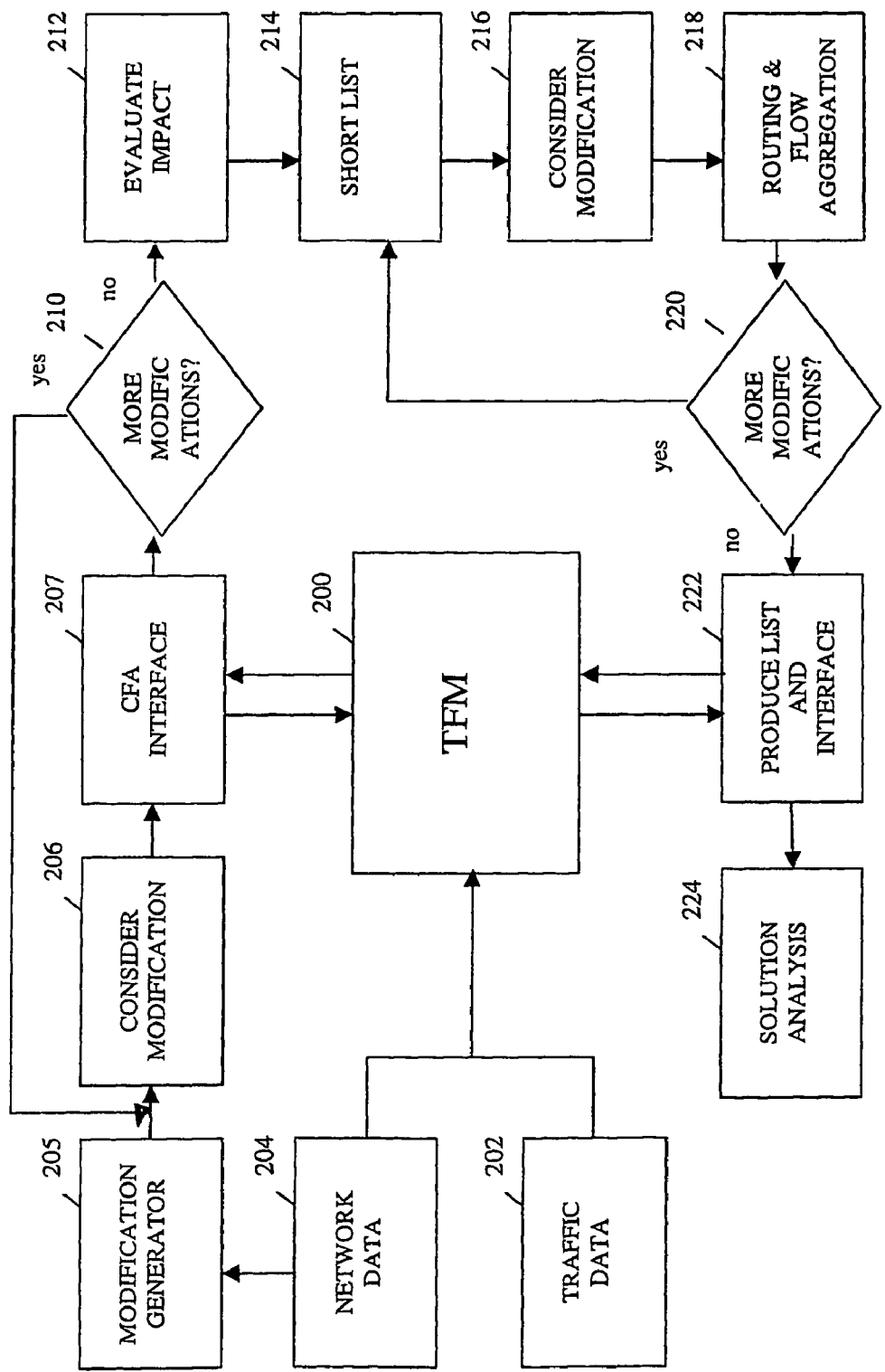
FIG. 5 is a flow chart diagram illustrating individual steps in a traffic flow optimiser according to one further embodiment of the present invention.

Referring now to FIG. 5, we describe how the same TFM can be used to calculate the cumulated flow and also for a full calculation of the traffic values. Details of the TFM may be found in co-pending patent application referred to above.

Steps 202 to 206 of providing traffic and network data and considering modifications are the same as steps 102 to 106 described above with reference to FIG. 4. However, instead of performing the CFA directly from the information provided, the network and traffic data are provided to set up a traffic flow model (step 200). The information about the modification considered is provided to a CFA interface in step 207. The cumulated flow to be calculated can be expressed as a linear constraint in the TFM and the TFM is used to derive the cumulated flow from the traffic and network data. Steps 210 to 214 are again analogous to steps 110 to 114. The short list of "best candidates" produced in step 214 is now used to perform a full analysis (i.e. calculation of the traffic data) of these best candidates. A first modification of the list is considered in step 216. Routing has now to be performed in the modified network. Solution variables (i.e. traffic) terms to be calculated are defined and stored (step 218). This procedure of steps 216 and 218 is repeated until all modifications of the short list are considered. A list of all solution variables is produced in step 222, and the interface provides the information to the TFM 200. In the full analysis now upper and lower bounds or values of data traffic are calculated for the modified scenarios listed as best candidates from the CFA. In step 224 the derived traffic values or bound are analysed. The calculations resulting from the full TFM analysis are more accurate than the CFA results. However, the CFA analysis is useful to reduce the number of candidates for which a full analysis has to be performed.

In this way an automatic evaluation of a set of possible modifications is possible without the need of running a full, and thus time and resource-consuming, analysis for all possible modifications.

The cumulated flow analysis can be performed on a plurality of measured data sets. In the planning of a network change it is often desired to take into account multiple traffic data sets. In this way we do not restrict ourselves to the use of one particular data set which was collected at one particular time interval in the network considered. Instead, multiple data sets collected at different times may be used in one analysis. This is important as the traffic may considerably differ at different times. The results obtained in this way are thus much more consistent and meaningful. If we plan a modification of the network and a considered modification has a large impact in all data sets, i.e. to all times promising modifications considered in the analysis, then this points out a much more serious problem compared to a situation where the impact is large in one data set only.

We analyse the multiple data sets independently and then combine the results. In this way we keep all information about correlation between the different traffic values. However, this method requires running of the CFA for each data set separately. Alternatively, we combine the multiple data sets into one merged data set and run the traffic flow optimiser based on this merged data set. In this case we loose the correlation between the individual traffic data measurements and the resulting cumulated flow are less accurate.

Whilst in the above described embodiments traffic measurements have been described as input data for a CFA, it is appreciated that alternatively other traffic data can be used.

Whilst in the above described embodiments. IP networks are described, it is appreciated that the invention may be implemented into other types of communication.

Whilst in the above described embodiments the traffic data measurements are obtained using the SNMP, it is appreciated that alternatively other methods can be used.

Whilst in the above described embodiments a specific set of traffic data measurements obtained from the router and router interfaces are described, it is appreciated that other measurements can be used instead or in addition to the measurements described.

It is to be understood that the embodiments described above are preferred embodiments only. Namely, various features may be omitted, modified or substituted by equivalents without department from the scope of the present invention, which is defined in the accompanying claims.

The invention claimed is:

1. A method of estimating traffic values or intervals in a communications network, the network comprising a plurality of nodes being interconnected by links, the method comprising:
   obtaining traffic data through said nodes or links as input data comprising traffic measurements for said links obtained from one or more of the nodes in the network;
   obtaining network data relating to a network topology and network behaviour, said network data comprising end-to-end paths in the network;
   estimating an effect of a modification of said communications network or its behaviour by calculating traffic information between a selected first and a selected second node of said network using said input data;
   repeating estimating the effect of a modification for different pairs of said first and second nodes corresponding to different modifications;
   selecting, according to predefined criteria, one or more candidates for modifying said communications network corresponding to one or more of said modifications; and
   calculating an analysis of traffic values or traffic intervals for one or more of the selected candidates.

2. A method according to claim 1, wherein said traffic information is a cumulated traffic flow.

3. A method according to claim 1, wherein said modification of said network or network behaviour comprises one or more of: a modification of the network topology, a modified routing algorithm parameter, a modified traffic engineering constraint or a modified traffic load.

4. A method according to claim 1, further comprising correcting said input traffic data if inconsistencies are detected.

5. A method according to claim 1, wherein said traffic information is calculated using linear constraints in a traffic flow model.

6. A method according to claim 1, further comprising evaluating the impact of the network or network behaviour modification from the calculated traffic information.

7. A method according to claim 1, wherein said traffic values or intervals are calculated using a traffic flow model being based on:
   traffic data measurements through said nodes and links as input data; and
   a plurality of constraints describing network topology and behaviour.

8. The method of claim 1 wherein said network data further comprises router and routing information.

9. The method of claim 1 wherein estimating the effect of a modification comprises utilizing cumulated flow analysis.

10. The method of claim 1 further comprising generating a traffic flow model utilizing said traffic and network data and utilizing said traffic flow model to estimate the effect of said modification.

11. A method of calculating traffic values or intervals in a communications network, the communications network comprising a plurality of nodes, the nodes being connected to one another by links, the method of comprising:
   calculating a cumulated traffic flow between a first and second of said nodes in a traffic flow model of the communications network using linear constraints;
   said traffic flow model being based on:
   traffic data measurements through said nodes and links as input data; and
   a plurality of constraints describing the network topology and behaviour, said network topology comprising end-to-end paths in the network;
   correcting said input data if inconsistencies are detected, wherein correcting comprises using said traffic data measurements and said constraints; and
   estimating the effect of a modification of the communications network or its behaviour using said traffic flow model, wherein said modification of said network or network behaviour comprises one or more of: a modification of the network topology, a modified routing algorithm parameter, a modified traffic engineering constraint, or a modified traffic load.

12. The method of claim 11 wherein said constraints comprise:
   for each route, traffic coming in is equal to traffic going out; and
   for each link between an interface j of a router i and an interface l of a router k, outgoing traffic data on the interface j from the router i is equal to incoming traffic data on the interface l of the router k.

13. A method of modifying a communications network, the network comprising a plurality of nodes being interconnected by links, the method comprising:
- obtaining traffic data through said nodes or links as input data comprising traffic measurements for said links obtained from one or more of the nodes of the network;
- obtaining network data relating to the network topology and network behaviour, said network data comprising end-to-end paths in the network;
- automatically selecting promising candidates for a network modification by calculating a cumulated flow using said traffic and network data, wherein the candidates are selected according to predefined selection criteria;
- calculating an analysis of traffic values or traffic intervals for one or more of the selected candidates; and
- estimating the effect of said network modification.

14. An apparatus comprising a network management system comprising:
- a processor for:
  - obtaining traffic data through said nodes or links as input data comprising traffic measurements for said links obtained from one or more of the nodes in the network;
  - obtaining network data relating to a network topology and network behaviour, said network data comprising end-to-end paths in the network;
  - estimating an effect of a modification of said communications network or its behaviour by calculating traffic information between a selected first and a selected second node of said network using said input data;
  - repeating estimating the effect of a modification for different pairs of said first and second nodes corresponding to different modifications;
  - selecting, according to predefined criteria, one or more candidates for modifying said communications network corresponding to one or more of said modifications; and
  - calculating: an analysis of traffic values or traffic intervals for one or more of the selected candidates: and
- memory for storing said traffic data and said network data.

15. The apparatus of claim 14 wherein said modification of said network or network behaviour comprises one or more of: a modification of the network topology, a modified routing algorithm parameter, a modified traffic engineering constraint or a modified traffic load.

16. The apparatus of claim 14 wherein said traffic information is calculated using linear constraints in a traffic flow model.

17. The apparatus of claim 14 wherein said traffic values or intervals are calculated using a traffic flow model being based on:
- traffic data measurements through said nodes and links as input data; and
- a plurality of constraints describing network topology and behaviour.

18. A computer-readable non-transitory storage medium encoded with a computer program far modifying a communications network, the network comprising a plurality of nodes being interconnected by links when operated in a computer system; the computer program comprising:
- code for obtaining traffic data through said nodes or links as input data comprising traffic measurements for said links obtained from one or more of the nodes in the network;
- code for obtaining network data relating to a network topology and network behaviour, said network data comprising end-to-end paths in the network;
- code for automatically selecting promising candidates for a network modification by calculating a cumulated flow using said traffic and network data, wherein the candidates are selected according to predefined selection criteria;
- code for calculating an analysis of traffic values or traffic intervals for one or more of the selected candidates; and
- code for estimating the effect of said network modification.

* * * * *